United States Patent
Richter

(10) Patent No.: US 6,634,647 B2
(45) Date of Patent: Oct. 21, 2003

(54) MULTI-LINKED SEAL ASSEMBLY HAVING FRICTION-REDUCING LAYER

(75) Inventor: James R. Richter, Lincolnshire, IL (US)

(73) Assignee: Metraflex Company, Chicago, IL (US)

( * ) Notice: Subject to any disclaimer, the term of this patent is extended or adjusted under 35 U.S.C. 154(b) by 0 days.

(21) Appl. No.: 09/902,294

(22) Filed: Jul. 10, 2001

(65) Prior Publication Data

US 2003/0011141 A1 Jan. 16, 2003

(51) Int. Cl.$^7$ ............................................. F16L 21/02
(52) U.S. Cl. ..................... 277/314; 277/616; 289/216; 289/346; 289/328
(58) Field of Search ............................ 277/314, 603, 277/606, 616, 621, 626, 627, 658; 285/215, 216, 346, 328; 384/276; 29/898.06

(56) References Cited

U.S. PATENT DOCUMENTS

| | | | | | |
|---|---|---|---|---|---|
| 2,357,106 A | * | 8/1944 | Grenot | ........................ | 384/276 |
| 2,599,826 A | * | 6/1952 | Halstead et al. | ............ | 138/174 |
| 2,910,329 A | * | 10/1959 | Runton | .................... | 139/420 A |
| 3,068,053 A | * | 12/1962 | Runton et al. | .......... | 139/420 A |
| 3,528,668 A | * | 9/1970 | Barton | ........................ | 277/606 |
| 3,649,034 A | * | 3/1972 | Barton | ........................ | 277/606 |
| 3,703,297 A | * | 11/1972 | Gignac | ........................ | 277/606 |
| 3,899,227 A | * | 8/1975 | Harig | ........................ | 384/300 |
| 4,054,337 A | * | 10/1977 | Matt et al. | .................... | 384/299 |
| 4,566,545 A | * | 1/1986 | Story et al. | .................. | 175/226 |
| 5,288,354 A | * | 2/1994 | Harris et al. | ................. | 156/154 |
| 5,364,682 A | * | 11/1994 | Tanaka et al. | .............. | 384/908 |
| 5,462,291 A | * | 10/1995 | Maeda et al. | ................ | 277/507 |
| 5,480,231 A | * | 1/1996 | Sasaki et al. | ................ | 384/206 |
| 5,548,934 A | * | 8/1996 | Israelson | ......................... | 52/1 |
| 5,560,103 A | * | 10/1996 | Harris et al. | ................. | 156/154 |
| 5,697,194 A | * | 12/1997 | Gignac et al. | .............. | 138/106 |
| 5,713,392 A | * | 2/1998 | O'Rourke | .................... | 138/125 |

OTHER PUBLICATIONS

Web pages from Metraflex.com.

\* cited by examiner

*Primary Examiner*—Anthony Knight
*Assistant Examiner*—Alison Pickard
(74) *Attorney, Agent, or Firm*—Sonnenschein Nath & Rosenthal

(57) ABSTRACT

A annular seal assembly having a friction-reducing layer, such as wire mesh, on the inner surface that is in contact with a pipe, whereby the friction-reducing layer decreases the coefficient of friction between the pipe and the seal assembly is decreased so that the seal is not dislodged from the wall when the pipe is pushed through the seal assembly.

7 Claims, 3 Drawing Sheets

MULTI-LINKED SEAL ASSEMBLY HAVING FRICTION-REDUCING LAYER

FIELD OF THE INVENTION

The present invention relates to seals, and particularly to a seal for a pipe extending through a wall.

BACKGROUND OF THE INVENTION

Various seal assemblies can be used to seal the annular space between a pipe and a wall through which it extends. For example, Hauff, U.S. Pat. No. 4,993,724 teaches a circular elastic one-piece sealing structure having a split that can be deformed opposite to the split so that the structure can be spread to fit around the conduit. Similarly, Israelson, U.S. Pat. No. 5,548,934, is directed to a firestop that contains a one-piece seal which allows longitudinal and radial movement of a pipe located in a partition wall.

A multi-segmented seal assembly is also well-known in the art. For example, Thunderline Corporation (Belleville, Mich.) manufactures an annular seal assembly comprised of a number of segmented seal blocks connected by bolts to form a ring structure. Pressure plates are located on each face of the seal blocks. When the assembly is placed around a pipe in an annular space, the bolts are tightened, thereby compressing the seal blocks so that a seal is formed tightly engaging both the wall and the pipe. See Griffiths, U.S. Pat. No. 5,340,123; Griffiths, U.S. Pat. No. 5,213,341; Gignac, U.S. Pat. No. 3,703,297; Barton, U.S. Pat. No. 3,649,034; and Barton U.S. Pat. No. 3,528,668. Another multi-segmented seal assembly has been manufactured by the Metraflex Company (the assignee of the present invention) under the trademark METRASEAL®.

Conventional seal assemblies generally have an elastomeric material directly in contact with the pipe. As a result, when the pipe is pushed through the seal, the seal may become dislodged from the wall.

SUMMARY OF THE INVENTION

The present invention is directed to an improvement to such conventional seal assemblies. The present invention involves a seal assembly having a friction-reducing layer, such as wire mesh, in contact with the pipe. Because the coefficient of friction between the pipe and the seal assembly is decreased by the addition of the wire mesh, the seal is not dislodged from the wall when the pipe is pushed through the seal assembly.

The present invention is directed to an annular seal assembly comprised of a plurality of interlocking seal blocks connected to a plurality of pressure plates by a plurality of bolts to form a seal belt. The inner surface of the seal belt contains a friction-reducing layer, such as a wire mesh.

DESCRIPTION OF THE PREFERRED EMBODIMENTS

Figure 1:
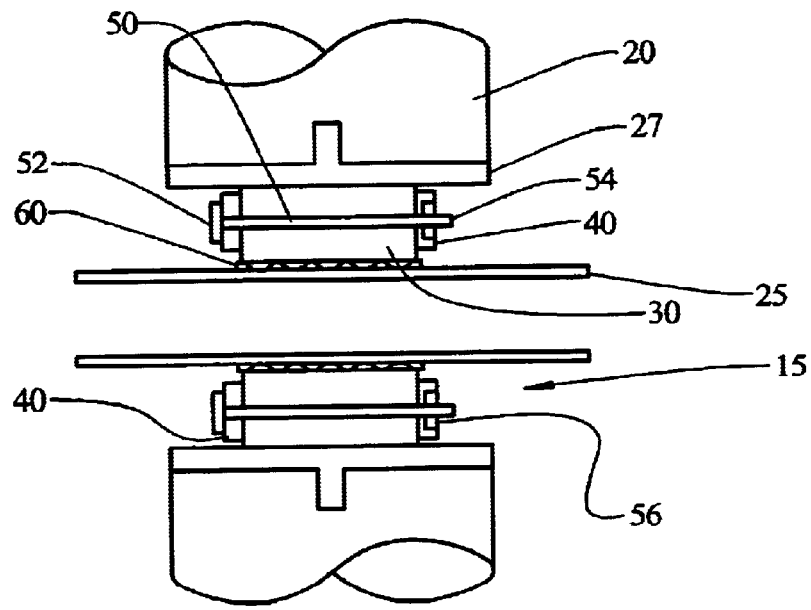
FIG. 1 is a cross-section of the seal block assembly of the present invention surrounding a pipe in an annular space in a wall.

The present invention is directed to an improved seal block assembly 10 that can be used to seal the annular space 15 between a pipe sleeve 27 and a pipe 25 extending through a wall 20. In the preferred embodiment, the improvement is made on the METRASEAL® seal assembly that has been available from the Metraflex Company (Chicago, Ill.) for a number of years.

In general, the seal assembly of the present invention includes a plurality of interlocking seal blocks 30 connected to a plurality of pressure plates 40 to form a seal belt 70. A friction-reducing layer 60 is disposed on the inner surface 72 of the seal belt 70—i.e., between the interlocking seal blocks 30 and the pipe 25.

Figure 2:
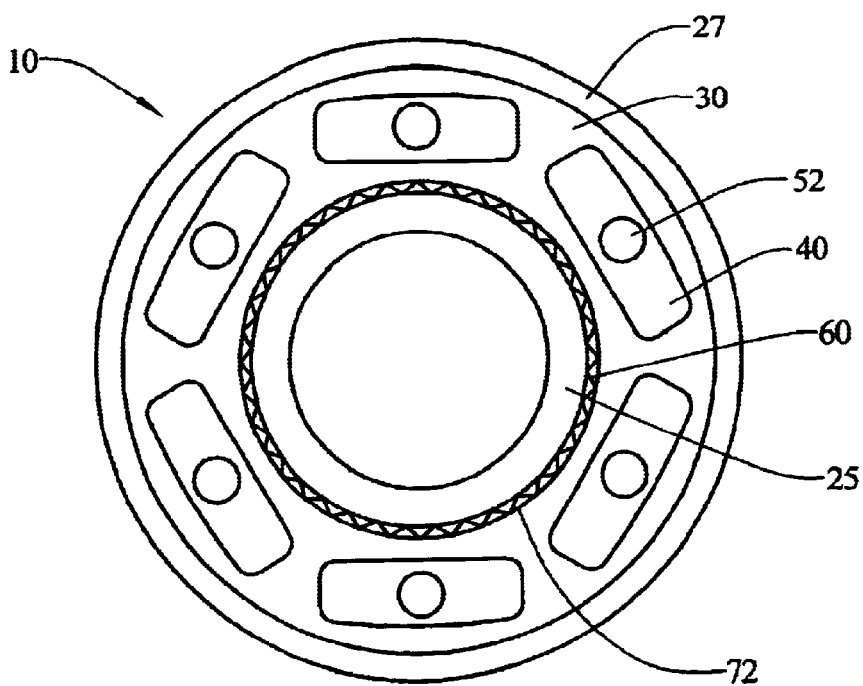
FIG. 2 is an end elevational view of the seal block assembly showing the wire mesh friction-reducing layer on the inner surface of the seal belt.
Figure 3:
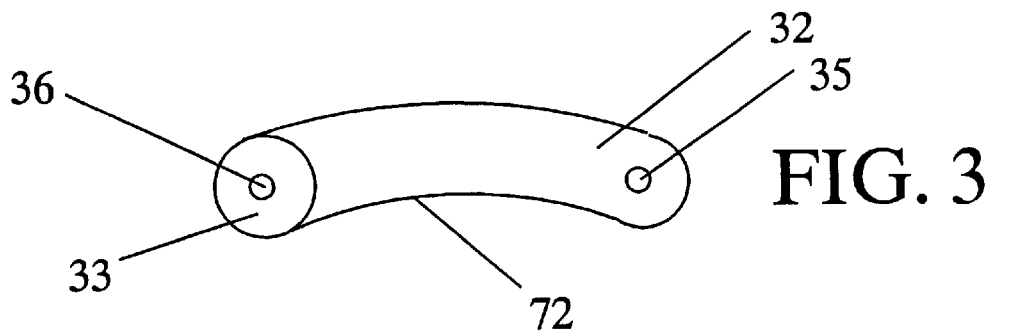
FIG. 3 is a top view of a seal block used in the seal block assembly of the present invention.
Figure 4:
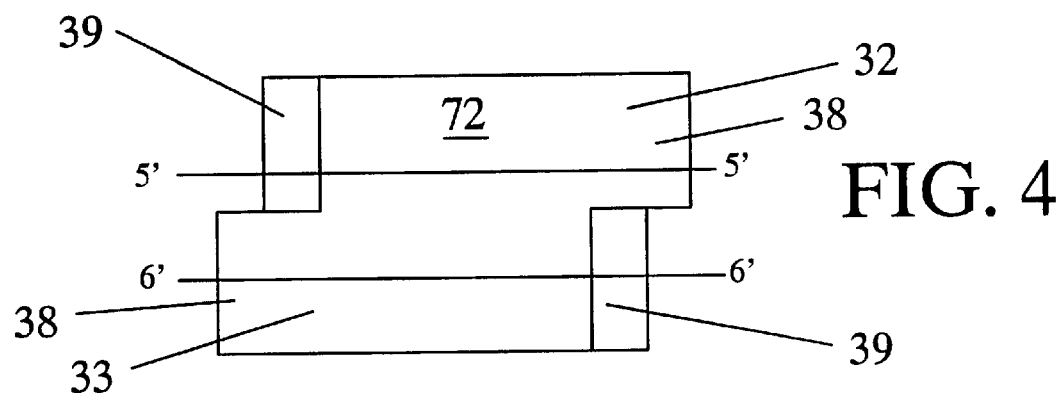
FIG. 4 is a side view of a seal block used in the seal block assembly of the present invention.
Figure 5:
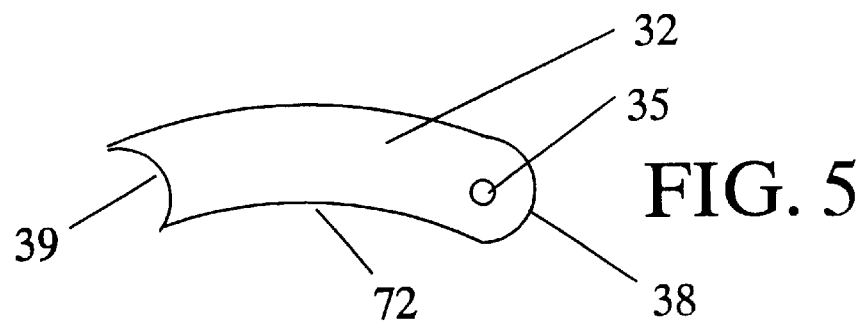
FIG. 5 is a cross-section of a seal block as taken through line 5'—5' in FIG. 4.
Figure 6:
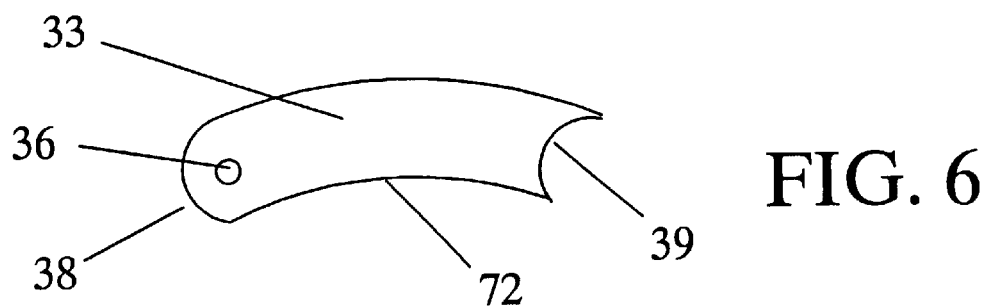
FIG. 6 is a cross-section of a seal block as taken through line 6'—6' in FIG. 4.

FIGS. 1 and 2 show the seal assembly 10 of the present invention as used in a wall 20. In the preferred embodiment, the seal blocks 30 are connected to each other and to the pressure plates 40 by a bolt and nut assembly to form a seal belt 70. In the preferred embodiment, a wire mesh is disposed on the inner surface 72 of the seal belt 70 to form a friction-reducing layer 60.

FIGS. 3–6 illustrate the preferred seal block 30 of the present invention. Although each seal block 30 is comprised of a continuous piece of material, each seal block has two longitudinal sections 32, 33. A hole 35, 36 resides in each longitudinal section. Each longitudinal section 32, 33 also has two ends 38, 39. The first end 38 is convex while the second end 39 is concave. The first convex end 38 of one seal block is engaged with a second concave end 39 of an adjacent seal block. While the preferred seal blocks are shown in FIGS. 3–6, any number of differently shaped and sized seal blocks are known to those skilled in the art.

Figure 7:
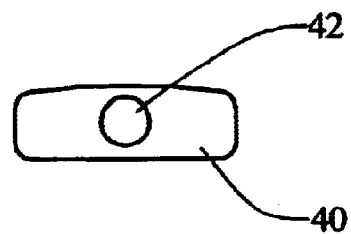
FIG. 7 is a top view of a pressure plate used in the seal block assembly of the present invention.
Figure 8:
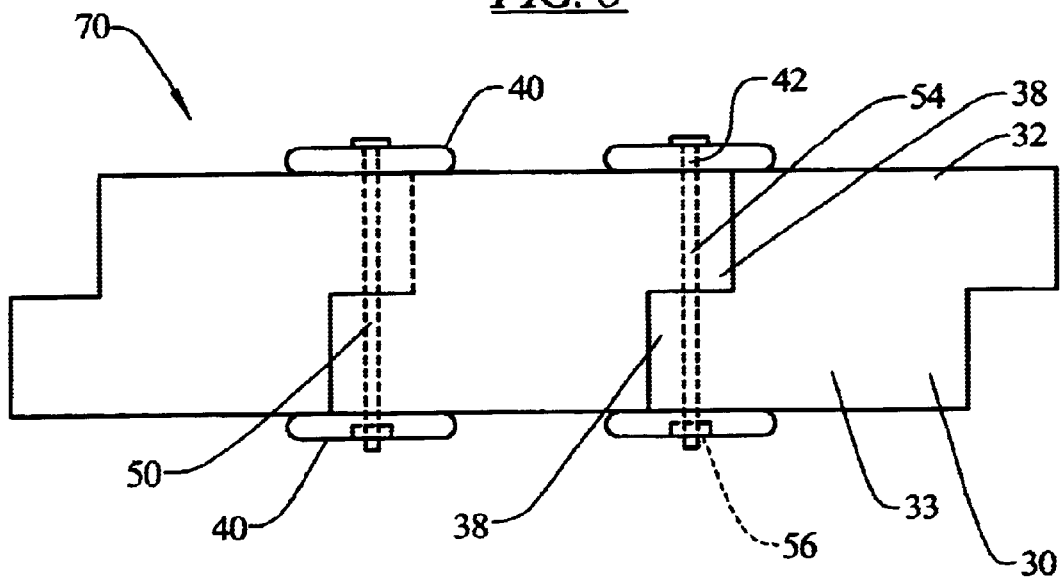
FIG. 8 is a side view of three seal blocks connected by two top and two bottom pressure plates and a nut and bolt assembly to form part of a seal belt of the seal block assembly of the present invention.

A pressure plate 40 of the present invention is shown in FIG. 7. While the preferred pressure plate is generally oval or crescent shaped, a number of differently shaped pressure plates are known to those skilled in the art. As shown in FIG. 8, the pressure plates 40 are connected to the seal blocks 30 to form the seal belt 70. A bolt 50 having a bolt head 52 and a bolt shaft 54 extends through an aperture 42 in each pressure plate 40, through the hole 35 in the first end 38 of a longitudinal section 32 of one seal block 30, through a hole 36 in the first end 38 of a longitudinal section 33 of an adjacent seal block 30, and through an aperture 42 in a second pressure plate 40. The second pressure plate 40 has a recess or socket. A nut 56 is positioned at the distal end of each bolt shaft 54 in the recess or socket. It should be noted that each bolt head 52 engages the pressure plate 40 entirely externally.

The length of the seal belt 70 depends on the number of seal blocks 30. The number of seal blocks depends on the circumference of the pipe 25 and the circumference of the pipe sleeve 27 or unsleeved round hole positioned in the wall 20. Determining the number of seal blocks is well known to those skilled in the art.

The present invention involves a friction-reducing layer 60 that is disposed on the inner surface 72 of the seal belt 70. In the preferred embodiment, the friction-reducing layer 60 is comprised of wire stainless steel mesh. The material can also be other metals, including carbon steel, expanded steel, galvanized steel, and may be coated with polyvinylchloride ("PVC"). The wire is preferably a 10 mesh—i.e., having 10 mesh wires per square inch.

One skilled in the art will understand that other friction-reducing layers can be employed. For example, a perforated metal, wire cloth, expanded metal grating or bar grating may be used. In addition, the material forming the friction-reducing layer is not limited to metals, but may be any material of sufficient durometer and resiliency to allow extrusion of the seal block through the friction reducing layer into contact with the pipe and at the same time reduce the friction between the seal block and the pipe.

During operation, the seal belt 70 having the friction-reducing layer 60 is wrapped around the pipe. The last ends of the seal belt 70 are joined by a final set of bolts 50, pressure plates 40, and nuts 56. The entire seal assembly 10 is then pushed along the pipe 25, lengthwise, into position in a wall sleeve 27. At this point, the bolts 50 are tightened so that the pressure plates 40 compress the seal blocks 30. The seal blocks 30 first expand radially toward the wall sleeve 27 and then expand inwardly toward the pipe 25 itself. As the seal blocks 30 expand toward the pipe 25, part of the seal block 30 extrudes through the holes in the wire mesh. Thus, both the wire mesh 60 and the extruded seal block 30 are in contact with the pipe 25. The net result is an air-tight, water-tight seal between the pipe and the wall sleeve in the wall. However, because the coefficient of friction between the pipe and the seal assembly is decreased by the addition of the wire mesh, the seal is not dislodged when the pipe is pushed through the seal assembly.

The seal blocks 30 are preferably comprised of an elastomeric material. They may be formed of a natural or synthetic rubber, urethane, EPDM, butyl silicone, or any other elastomeric or foam material having similar elastomeric properties. The blocks are preferably made by hot transfer molding.

The pressure plates 40 are preferably glass-reinforced plastic, but may be any plastic, composite material, metal, alloy, wood or compound that is rigid and relatively incompressible. The pressure plates are typically made by injection molding.

The bolts 50 and nuts 56 are preferably stainless steel or steel with a zinc dichromate coating. Other means for connecting the pressure plates 40 to the seal blocks 30 may be used and are well known in the art. These include a rivet, other pin connectors, and cam levers.

While the present invention has been shown and described with reference to the foregoing preferred embodiment, it will be apparent to those skilled in the art that other changes in form and detail may be made therein within the spirit and scope of the invention as defined in the appended claims. For example, the friction reducing layer of the present invention may be utilized in a one-piece seal block assembly like that disclosed by Hauff, U.S. Pat. No. 4,993,724 or Israelson, U.S. Pat. No. 5,548,934.

I claim:

1. A method of reducing the friction between an elastomeric seal member and a pipe extending through an annular space opening in a wall comprising:
   placing a wire mesh between said seal assembly and the pipe; and
   introducing the seal member between the pipe and the wall opening;
   compress said seal member such that it extrudes through said wire mesh into contact with said pipe.

2. The method in claim 1 wherein said wire mesh is a 10 mesh.

3. The method in claim 1 wherein said wire mesh is stainless steel.

4. A method of reducing the friction between an elastomeric seal member and a pipe extending through an annular space opening in a wall comprising:
   placing a friction reducing layer having openings therethrough between said seal member and the pipe; and
   introducing the seal member between the pipe and the wall opening;
   compressing said seal member such that it extrudes through said openings of said friction reducing layer into contact with said pipe.

5. The method according to claim 4, wherein said friction reducing layer is an expanded metal material.

6. The method according to claim 4, wherein said friction reducing layer is a perforated metal material.

7. The method according to claim 4, wherein said friction reducing layer is made, at least partially, of a plastic material.

* * * * *